United States Patent

Baker

[15] 3,700,878
[45] Oct. 24, 1972

[54] LIGHTING SYSTEMS FOR ROAD VEHICLES

[72] Inventor: Alfred Dickens Baker, Solihull, England

[73] Assignee: Joseph Lucas (Industries) Limited, Birmingham, England

[22] Filed: May 14, 1971

[21] Appl. No.: 143,641

Related U.S. Application Data

[63] Continuation of Ser. No. 796,326, Feb. 4, 1969, abandoned.

[30] Foreign Application Priority Data

Feb. 23, 1968  Great Britain............8,814/68

[52] U.S. Cl. ..............................240/7.1 LJ, 33/193
[51] Int. Cl. ...............................................B60q 1/06
[58] Field of Search....................240/7.1 LT; 33/193

[56] References Cited

UNITED STATES PATENTS

| | | |
|---|---|---|
| 2,984,737 | 5/1961 | Marcellus..............240/7.1 LT |
| 3,370,162 | 2/1968 | Biaband................240/7.1 LT |
| 2,945,470 | 7/1960 | Kolbe.........................116/2 D |

FOREIGN PATENTS OR APPLICATIONS 1,185,904  3/1970  Great Britain...............33/193

*Primary Examiner*—Samuel S. Matthews
*Assistant Examiner*—Russell E. Adams, Jr.
*Attorney*—Holman & Stern

[57] ABSTRACT

In a lighting system for a road vehicle automatic sensing means senses the attitude of the body of the road vehicle relative to the ground and operates a first indicator means within the vehicle so that the occupant knows the attitude of the vehicle relative to the ground. There is also control means operable by an occupant of the vehicle for adjusting the attitude of the headlamp and a second indicator means, which can be brought into alignment with the first indicator means by adjusting the headlamp to the correct position.

5 Claims, 6 Drawing Figures

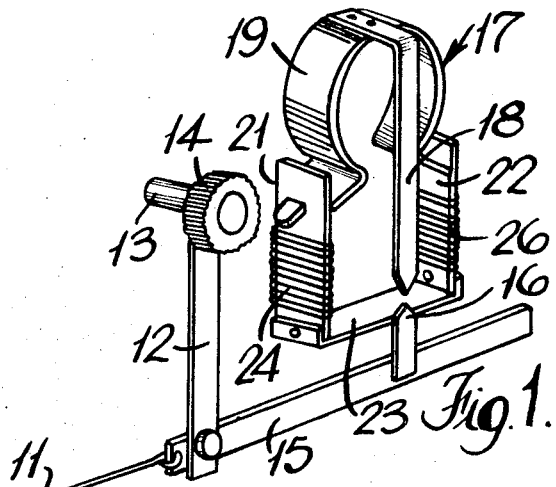
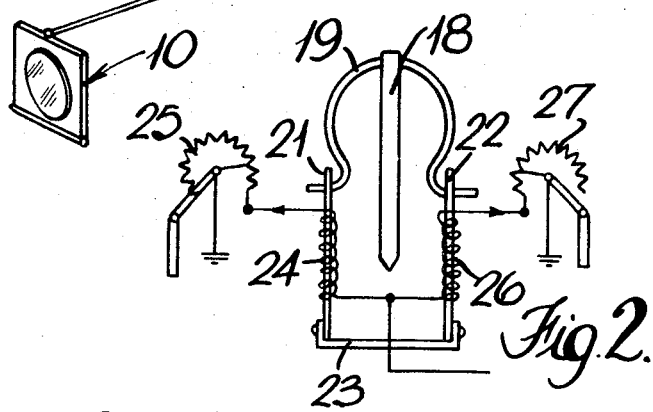
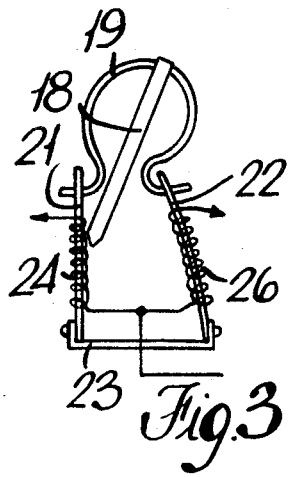
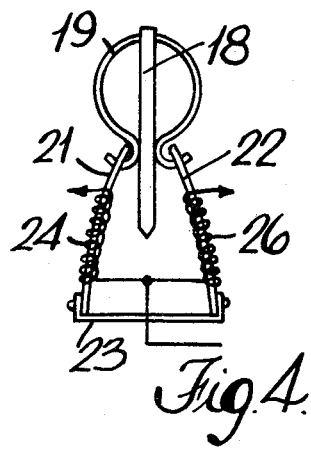

PATENTED OCT 24 1972

3,700,878

SHEET 2 OF 2

INVENTOR
Alfred Dickens Baker
BY Holman, Glascock,
Downing + Seebold
ATTORNEYS 3,700,878

LIGHTING SYSTEMS FOR ROAD VEHICLES

This application is a continuation of application, Ser. No. 796,326 filed Feb. 4, 1969, now abandoned.

This invention relates to lighting systems for road vehicles.

A lighting system according to the invention includes automatic sensing means for sensing the attitude of the body of the road vehicle relative to the ground, first indicator means within the vehicle and coupled to said sensing means so that an occupant of the vehicle receives an indication of said attitude, control means operable by an occupant of the vehicle for adjusting the attitude of a headlamp of the vehicle, and second indicator means within the vehicle and associated with said control means, both the first and second indicator means being visible to the occupant and the arrangement being such that operation of the control means so that the first and second indicator means are in predetermined relationship to one another adjusts the headlamps to the correct position, to compensate for alterations in the inclination of the beam of said headlamp with respect to said ground.

Figure 5:
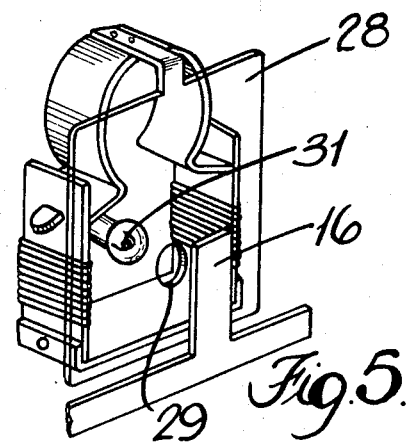
Figure 6:
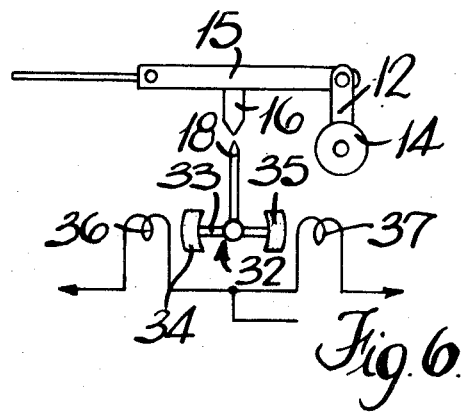

In the accompanying drawings:

FIG. 1 is a fragmentary perspective view of part of the lighting system for a road vehicle according to one example of the invention, FIG. 2 is a front elevational view of part of FIG. 1, illustrating diagrammatically the electrical connection thereto, FIG. 3 is a fragmentary view similar to FIG. 2, showing the part shown in FIG. 2 in a first operative position, FIG. 4 is a view similar to FIG. 3 illustrating a second operative position, FIG. 5 is a view similar to FIG. 1 of part of a lighting system for a road vehicle according to a second example of the invention, and FIG. 6 is a diagrammatic, front elevational view of part of a lighting system for a road vehicle according to a third example of the invention.

Referring first to FIGS. 1 to 4, a road vehicle is provided with a pair of headlamps, which are pivotally mounted on the body of the road vehicle for movement about a generally horizontal axis. A linkage, preferably in the form of a Bowden cable 11 extends from the headlamps 10 and is connected to one end of a radius arm 12, the other end of which is secured to a shaft 13 through which the radius arm 12 is pivotally mounted within the passenger compartment of the vehicle. The shaft 13 carries a setting knob 14 through which the arm 12 can be pivoted to adjust the positioning of the headlamps. A rigid strip 15 is pivotally connected at one end to said one end of the radius arm 12, and the strip 15 is mounted for sliding movement in a housing secured within the passenger compartment of the vehicle. Upstanding from the strip 15 is a pointer 16, the pointer 16 constituting the visible part of a headlamp position indicator. Also mounted within said housing is an indicator 17 which gives an indication of the attitude of the body of the road vehicle relative to the ground occupied by the road vehicle.

The indicator 17 includes a pointer 18 which is secured to a semi-circular spring strip 19, midway between the ends of the strip 19. The ends of the strip 19 are secured respectively to the ends of a pair of parallel bi-metallic strips 21, 22 which at their other ends are secured to a mounting plate 23 which in turn is secured to said housing. A heating coil 24 is wound around the bi-metallic strip 21, one end of the coil 24 being grounded and its other end being connected through a rheostat 25 to one terminal of the battery of the vehicle, the other terminal of the battery being connected to ground. The fixed part of the rheostat 25 is secured to the body of the road vehicle, while the movable part of the rheostat is connected to a front suspension member of the vehicle, so that alterations in the height of the front of the body of the vehicle relative to the ground cause alterations in the setting of the rheostat 25 and consequential alterations in the heating current supplied to the heating coil 24. A similar heating coil 26 is wound around the bi-metallic strip 22, and the coil 26 is similarly connected to a further rheostat 27. The fixed part of the rheostat 27 is secured to the rear part of the vehicle body, while the movable part of the rheostat is secured to a rear suspension member of the vehicle, in such a manner that variations in the position of the rear of the vehicle body relative to the road cause alterations in the setting of the rheostat 27, with consequential alterations in the heating current flowing in the heating coil 26.

In use, when the body of the road vehicle is parallel with the ground occupied by the vehicle, the settings of the rheostats 25, 27 will be the same, and consequently the same heating current will be flowing in the heating coils 24, 26. Since the magnitude of the current flowing in the coils 24, 26 is the same the strips 21, 22 will be heated by the same amount, and will flex through the same angle. The strips 21, 22 are arranged to flex towards one another when heated, and since the strips 21, 22 flex by the same amount the position of the midpoint of the spring strip 19 and consequently the position of the pointer 18 will not change. However, when for example the rear of the vehicle is loaded, then the rear of the vehicle will move down relative to the ground, and the settings of the rheostats 25, 27 will no longer be the same. Since the settings of the rheostats 25, 27 are different, the heating currents flowing in the windings 24, 26 will be different, and the strips 21, 22 will flex by different amounts, and the position of the pointer 18 will be altered. The system is so arranged that when the pointers 16, 18 are aligned with one another, then the positioning of the headlamps of the vehicle is such that their beams are directed at the desired angle of inclination with respect to the ground. Thus, when the attitude of the body of the vehicle, relative to the ground, changes, then the position of the pointer 18 will alter, and by turning the knob 14 until the pointer 16 is once again aligned with the pointer 18 the headlamps of the vehicle will once again be positioned relative to the body of the vehicle, so that their beams are directed at the desired angle of inclination to the ground.

It will be appreciated that since the movement of the pointer 18 is dependent upon heating and cooling of the bi-metallic strips 21, 22 then the indicator 17 will not react to normal suspension movements of the vehicle when the vehicle is travelling over uneven ground.

In the example shown in FIG. 5, the pointer 18 is replaced by a plate 28 having a hole 29 therein. Note that whereas plate 28 is, in reality, opaque it has been shown as though transparent for purposes of illustration only. A light source 31 is positioned on the side of the plate remote from the pointer 16, and in order to adjust the headlamps of the vehicle to the desired position the knob 14 is turned until the pointer 16 covers the hole 29 so that the operator cannot see the light source 31 through the hole 29.

In the third example of the invention illustrated in FIG. 6, the indicator 17 described above is replaced by an indicator 32 including an arm 33 which is pivotally supported mid-way between its end. Secured to the arm 33 at its mid-point, and extending at right angles thereto is a pointer 18, and secured to the arm 32 at opposite ends thereof respectively are a pair of pole pieces 34, 35. Associated with the pole piece 34 is a first deflection coil 36 which is connected in series with the rheostat 25 described above. Similarly, associated with the pole piece 35 is a second deflection coil 37 which is connected in series with the rheostat 27 described above. The arm 32 is spring urged to a central position, and the arrangement is such that variations in the setting of the rheostats 25, 27 cause corresponding variations in the currents flowing in the deflection coils 36, 37 with corresponding deflection of the arm 32 and the pointer 18. As before the pointer 16 on the slide 15 is moved into alignment with the pointer 18 to adjust the headlamps of the vehicle to the desired position.

In a modification of the example shown in FIG. 6, the arm 32 is shaped at one end to define the pointer 18 and carries at its other end a single pole piece with which the deflection coils 36, 37 are associated. The arrangement is such that when the magnitude of the current flowing in the two deflection windings is the same then the deflection windings cancel each other out and there is no movement of the pointer 18, but when the current flowing in one of the windings is greater than the current flowing in the other winding, then the single pole piece, and consequently the pointer 18, is moved accordingly.

I claim:

1. A lighting system for a road vehicle, said system including:

automatic electrical sensing means for sensing the pitch of the body of the road vehicle relative to the ground, said sensing means comprising a pair of rheostats associated with the front and rear suspension members of the vehicle respectively, each rheostat having a fixed part and a moveable part, one part being coupled to a suspension member, the other part being coupled to the body of the vehicle, and a pair of windings through which current flows by way of the rheostats respectively;

first moveable indicator means within the vehicle and coupled to said pair of windings, the windings when energized serving to move said first indicator means in opposite directions, respectively, so that the occupant of the vehicle receives an indication of said vehicle pitch;

control means within the vehicle operable by an occupant of the vehicle for adjusting the attitude of a headlamp of the vehicle;

second moveable indicator means within the vehicle and associated with said control means for indicating attitude of the headlamps with respect to the body of a vehicle, said second indicator means being substantially juxtaposed with respect to said first indicator means, said first and said second indicator means being calibrated such that alignment of said indicator means with respect to one another by operation of said control means adjusts the headlamp of the vehicle to a predetermined attitude with respect to the ground.

2. A system as defined in claim 1, in which the windings heat a pair of bi-metallic strips respectively, the strips being coupled to the first indicator means.

3. A system as defined in claim 1, wherein the windings are electromagnet windings acting on a common pole coupled to the first indicator means.

4. A system as defined in claim 1, wherein the first and second indicator means are pointers, the headlamps being in the correct position when both pointers are aligned with one another.

5. A system as defined in claim 1, wherein one of the indicator means is in the form of a plate having therein an aperture which is illuminated by a light source, and wherein the other indicator means is a pointer which covers the aperture when the headlamp is in the correct position.

* * * * *